(12) United States Patent
Takanashi et al.

(10) Patent No.: US 10,281,601 B2
(45) Date of Patent: May 7, 2019

(54) VIBRATION DETECTING SYSTEM, SIGNAL PROCESSING APPARATUS AND SIGNAL PROCESSING METHOD

(71) Applicants: Japan Oil, Gas and Metals National Corporation, Tokyo (JP); Junzo Kasahara, Saitama (JP)

(72) Inventors: Mamoru Takanashi, Tokyo (JP); Ayato Kato, Tokyo (JP); Junzo Kasahara, Saitama (JP); Yoko Hasada, Tokyo (JP)

(73) Assignees: Japan Oil, Gas and Metals National Corporation, Tokyo (JP); Junzo KASAHARA, Saitama (JP)

( * ) Notice: Subject to any disclaimer, the term of this patent is extended or adjusted under 35 U.S.C. 154(b) by 217 days.

(21) Appl. No.: 15/355,878

(22) Filed: Nov. 18, 2016

(65) Prior Publication Data

US 2017/0068004 A1    Mar. 9, 2017

Related U.S. Application Data

(63) Continuation of application No. PCT/JP2015/065110, filed on May 26, 2015.

(30) Foreign Application Priority Data

May 27, 2014  (JP) .................... 2014-108923

(51) Int. Cl.
  *G01V 1/00*  (2006.01)
  *G01V 1/16*  (2006.01)
  (Continued)

(52) U.S. Cl.
  CPC ............. *G01V 1/003* (2013.01); *G01V 1/001* (2013.01); *G01V 1/164* (2013.01); *G01V 1/284* (2013.01);
  (Continued)

(58) Field of Classification Search
  CPC ........ G01V 1/003; G01V 1/001; G01V 1/164; G01V 1/284; G01V 1/288; G01V 1/364;
  (Continued)

(56) References Cited

U.S. PATENT DOCUMENTS

| | | | |
|---|---|---|---|
| 7,639,567 B2 * | 12/2009 | Sitton | G01V 1/005 181/113 |
| 7,864,630 B2 * | 1/2011 | Chiu | G01V 1/005 367/38 |

(Continued)

FOREIGN PATENT DOCUMENTS

| | | |
|---|---|---|
| JP | 2007-304100 A | 11/2007 |
| JP | 2012-108072 A | 6/2012 |
| WO | 2011/007706 A1 | 1/2011 |

OTHER PUBLICATIONS

International Search Report issued in PCT/JP2015/065110, dated Aug. 18, 2015, with translation (3 pages).

(Continued)

*Primary Examiner* — Krystine E Breier
(74) *Attorney, Agent, or Firm* — Nakanishi IP Associates, LLC

(57) ABSTRACT

A vibration detection system includes a seismic source device that generates a vibration wave repeated with a predetermined period, a vibration receiving device that receives a response wave due to the vibration wave transmitted via the ground, and a signal processing apparatus that processes measured vibration signals received by the vibration receiving device. The signal processing apparatus includes a separating part that separates individual periodic signals having a period according to a periodicity of the vibration wave generated by the seismic source from the measured vibration signals, the calculating part that calculates the standard periodic signal from the separated individual periodic signals, and the generating part that subtracts (Continued)

the standard periodic signal from the measured vibration signals and generates differential signals.

8 Claims, 9 Drawing Sheets

(51) Int. Cl.
  *G01V 1/28* (2006.01)
  *G01V 1/36* (2006.01)
  *G01V 1/37* (2006.01)
  *G01V 1/153* (2006.01)

(52) U.S. Cl.
  CPC .............. *G01V 1/288* (2013.01); *G01V 1/364* (2013.01); *G01V 1/37* (2013.01); *G01V 1/153* (2013.01); *G01V 2210/1232* (2013.01); *G01V 2210/21* (2013.01); *G01V 2210/34* (2013.01); *G01V 2210/646* (2013.01)

(58) Field of Classification Search
  CPC .. G01V 1/37; G01V 1/153; G01V 2210/1232; G01V 2210/21; G01V 2210/34; G01V 2210/646
  See application file for complete search history.

(56) References Cited

U.S. PATENT DOCUMENTS

| | | | | |
|---|---|---|---|---|
| 8,027,223 B2* | 9/2011 | West | .................. | G01V 1/143 |
| | | | | 367/189 |
| 8,553,497 B2* | 10/2013 | Krohn | .................. | G01V 1/364 |
| | | | | 367/45 |
| 8,938,363 B2* | 1/2015 | Beasley | .................. | E21B 43/26 |
| | | | | 166/308.1 |
| 9,075,162 B2* | 7/2015 | Baardman | .................. | G01V 1/36 |
| 9,207,345 B2* | 12/2015 | Khalil | .................. | G01V 1/36 |
| 9,213,119 B2* | 12/2015 | Eick | .................. | G01V 1/3808 |
| 9,372,272 B2* | 6/2016 | Price | .................. | G01V 1/008 |
| 9,405,027 B2* | 8/2016 | Rentsch-Smith | ........ | G01V 1/38 |
| 2006/0164916 A1* | 7/2006 | Krohn | .................. | G01V 1/005 |
| | | | | 367/41 |
| 2007/0265782 A1 | 11/2007 | Kleinberg | | |
| 2012/0166123 A1 | 6/2012 | Hino et al. | | |
| 2014/0060958 A1* | 3/2014 | Eick | .................. | G01V 1/153 |
| | | | | 181/121 |
| 2016/0077226 A1* | 3/2016 | Bianchi | .................. | G01V 1/005 |
| | | | | 367/58 |

OTHER PUBLICATIONS

Written Opinion of International Search Authority issued in PCT/JP2015/065110, dated Aug. 18, 2015 (3 pages).

* cited by examiner

FIRST ONE HOUR

NEXT ONE HOUR

Transfer function H(ω)
NORMAL OPERATION $H(\omega) = 1/f(\omega) * R(\omega)$

REVERSE OPERATION $R(\omega)$: Measured
$R'(\omega)$: Standard  $R'(\omega) = H(\omega) * f(\omega)$ $R(\omega) - R'(\omega)$
$= R(\omega) - \{H(\omega) * f(\omega)\}$

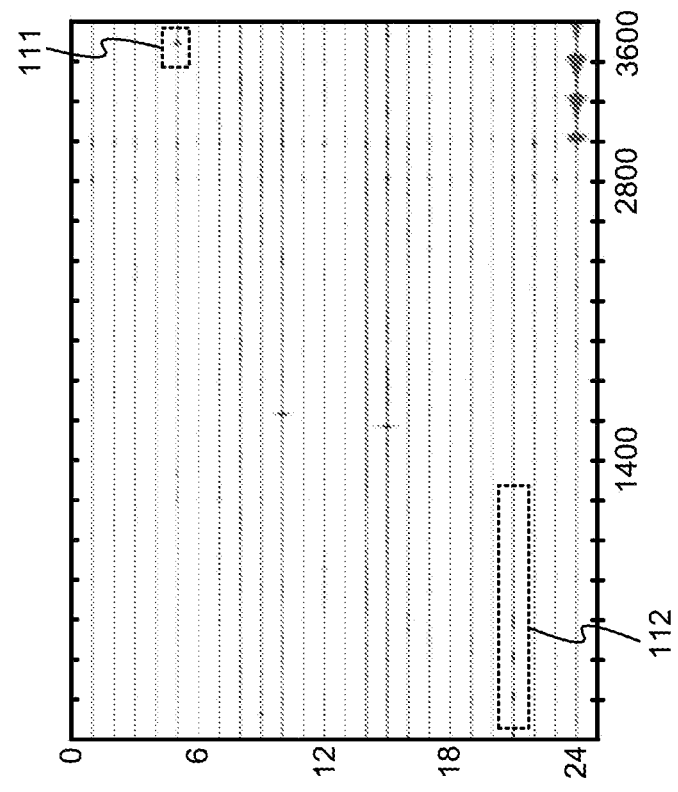
FIG. 14B PROCESSED
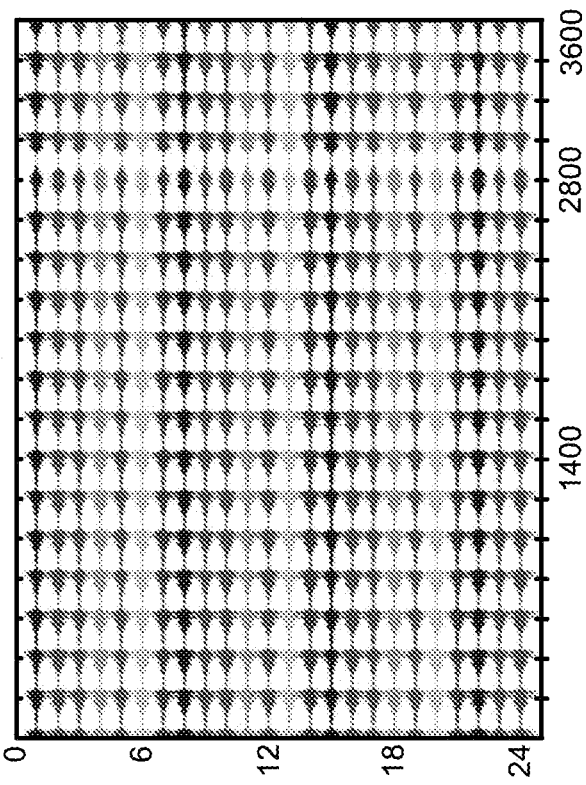
FIG. 14A ORIGINAL WAVEFORM

VIBRATION DETECTING SYSTEM, SIGNAL PROCESSING APPARATUS AND SIGNAL PROCESSING METHOD

CROSS-REFERENCE TO RELATED APPLICATIONS

The present application is a continuation application of International Application number PCT/JP2015/065110, filed on May 26, 2015, which claims priority under 35 U.S.C § 119(a) to Japanese Patent Application No. 2014-108923, filed on May 27, 2014. The content of this application is incorporated herein by reference in their entirety.

BACKGROUND OF THE INVENTION

The present invention relates to a vibration detection system, a signal processing apparatus, and a signal processing method for removing influence of vibration waves generated from a seismic source device and detecting vibrations in the ground.

Conventionally, an active seismic exploration for observing a state in the ground by radiating artificial vibration waves into the around and receiving the vibration transmitted in the ground near the ground surface is known. The Accurately Controlled Routinely Operated Signal System (ACROSS), which is a permanent seismic source device, has been noticed as a stationary seismic source that is suitable for such an active seismic exploration. The ACROSS can generate precisely controlled signals (vibration waves) by rotating an eccentric weight and is suitable for observation in the ground.

Japanese Unexamined Patent Application Publication No. 2007-304100 discloses a method for observing a state in the ground by recording energy of reflected waves that are originated by reflection of signals generated by a seismic source device at a dike layer.

It should be noted that shale gas has recently become a new attractive natural gas resource. Shale gas is collected by using hydraulic fracturing that includes inserting a pipe horizontally into a shale layer containing shale gas and making artificial fractures by injecting high-pressure water through this pipe.

Here, it is important when controlling the hydraulic fracturing to monitor a fracture generating area by continuously observing microseisms caused by the fracturing. When the seismic source device used for the above-mentioned active seismic exploration is operated in the vicinity of a point where the hydraulic fracturing is performed, the vibration waves generated from this seismic source device become noise in the microseisms caused by the hydraulic fracturing and a precise observation of the microseisms cannot be performed. Accordingly, in general cases, the operation of the seismic source device is stopped while the microseisms are observed, and the active seismic exploration is performed at a time other than while the microseisms are observed.

Further, it is important to continuously monitor a foreshock and a preslip for predicting a natural earthquake, but the vibration waves generated from the seismic source device appear as noise in the monitoring of a natural earthquake. Since nobody knows when a natural earthquake occurs, an operation of the seismic source device is not able to be stopped according to the occurrence of a natural earthquake, hence further contrivance that allows monitoring without stopping the seismic source device is required.

BRIEF SUMMARY OF THE INVENTION

This invention focuses on these points, and the object of the invention is to provide a vibration detection system, a signal processing apparatus, and a signal processing method that are capable of removing an influence due to vibration waves generated from a seismic source device.

In the first aspect of the present disclosure, a vibration detection system that comprises a seismic source device that generates a vibration wave repeated with a prescribed period, a vibration receiving device that receives response waves due to the vibration wave transmitted via the ground, and a signal processing apparatus that processes vibration signals according to the response waves received by the vibration receiving device. In the vibration detection system, the signal processing apparatus includes a storage that stores vibration signals received by the vibration receiving device, a separating part that separates individual periodic signals having a period according to a periodicity of the vibration wave generated by the seismic source device from the stored vibration signals, a calculating part that calculates a standard periodic signal from the separated individual periodic signals, and a generating part that generates differential signals indicating the difference between the vibration signals received by the vibration receiving device and the standard periodic signal.

In the second aspect of the present disclosure, a signal processing apparatus for removing signals due to vibration waves generated by a seismic source device from vibration signals received by a vibration receiving device is provided. The signal processing apparatus comprises a storage that stores vibration signals received by the vibration receiving device, a separating part that separates individual periodic signals having a period according to a periodicity of the vibration wave generated by the seismic source device from the stored vibration signals, a calculating part that calculates a standard periodic signal from the separated individual periodic signals, and a generating part that generates differential signals indicating the difference between the vibration signals received by the vibration receiving device and the standard periodic signal.

In the third aspect of the present disclosure, a signal processing method for removing signals due to vibration waves generated by a seismic source device from vibration signals received by a vibration receiving device is provided. The signal processing method comprises storing vibration signals received by the vibration receiving device, separating individual periodic signals having a period according to a periodicity of the vibration wave generated by the seismic source device from the stored vibration signals, calculating a standard periodic signal from the separated individual periodic signals, and generating differential signals indicating the difference between the vibration signals received by the vibration receiving device and the standard periodic signal.

BRIEF DESCRIPTION OF THE DRAWINGS

FIG. 14A shows an example of the result of the experiment.

FIG. 14B shows an example of the result of the experiment.

DETAILED DESCRIPTION OF THE INVENTION

Hereinafter, the present invention is described though the exemplary embodiment of the invention but the undermentioned embodiment does not limit the invention according to the claims and all of the combinations of characteristics described in the embodiment are not necessarily essential for a solution of the invention.

[Outline of the Vibration Detection System S]

Figure 1:
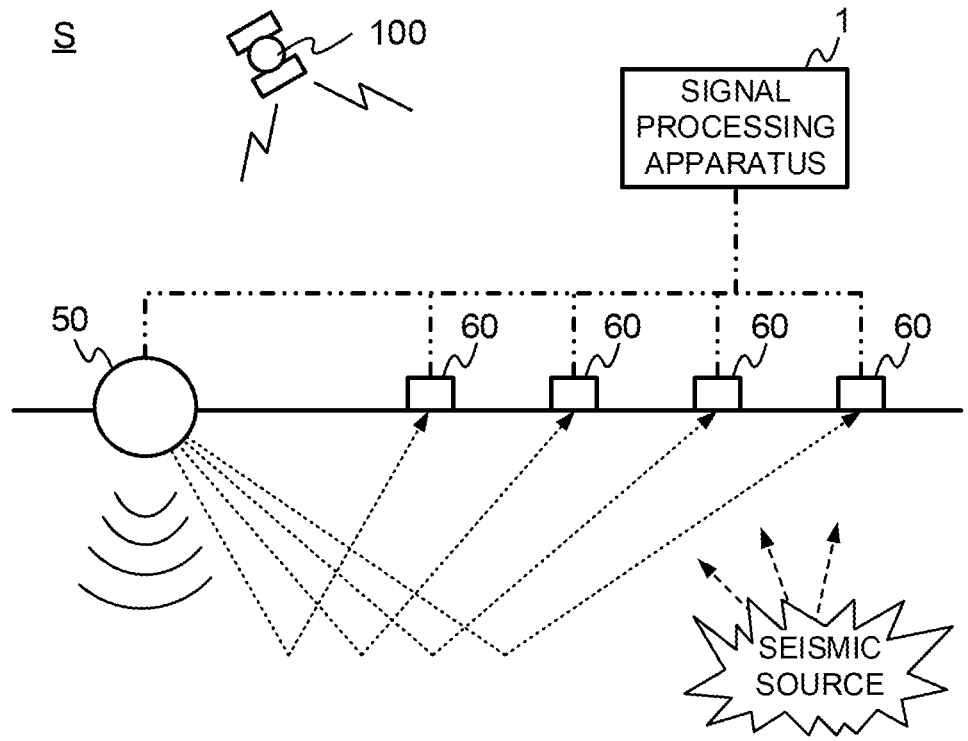
FIG. 1 shows a system configuration of a vibration detection system.

First, an outline of a vibration detection system S of the present disclosure is explained with reference to FIG. 1. FIG. 1 schematically shows a system configuration of the vibration detection system S. As shown in FIG. 1, the vibration detection system S includes a signal processing apparatus 1, a seismic source device 50, and a plurality of vibration receiving devices 60. It should be noted that the signal processing apparatus 1, the seismic source device 50, and the vibration receiving devices 60 are synchronized by a global positioning system (GPS) 100.

Figure 2:
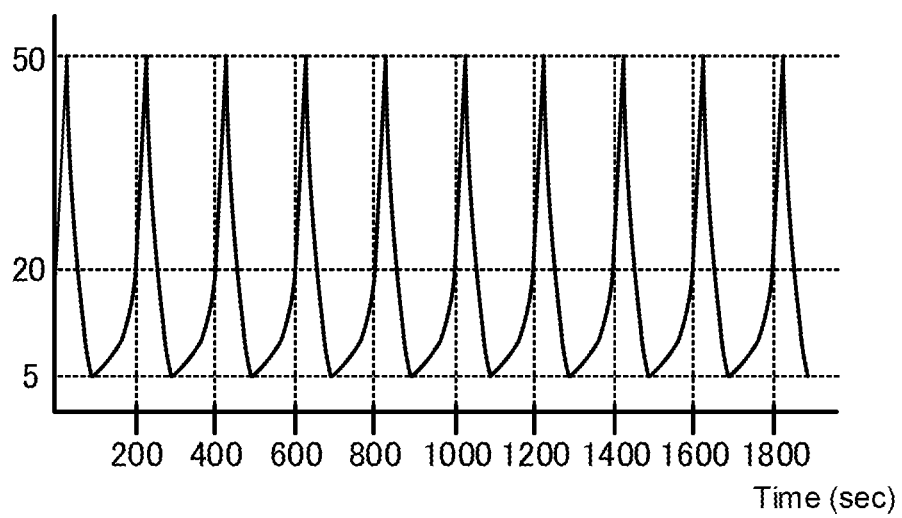
FIG. 2 shows a vibration wave generated by a seismic source device.

The seismic source device 50 artificially generates a controlled stationary vibration wave and radiates it into the underground. Here, an outline of the vibration wave generated by the seismic source device 50 is shown in FIG. 2. As shown in FIG. 2, the seismic source device 50 generates the vibration wave repeated at a prescribed period (for example, 200 seconds). The vibration wave generated from the seismic source device 50 has sweep waveforms in which the frequency varies at a prescribed period. Specifically, the seismic source device 50 of the present exemplary embodiment generates the vibration wave in which the frequency varies from 5 Hz to 50 Hz at a period of 200 seconds.

The plurality of vibration receiving devices 60 are seismographs with three axes (XYZ) that are each installed at different points. Each of the vibration receiving devices 60 measures vibration in the ground at the installed point by receiving vibration signals due to the vibration wave (response wave) that is generated from the seismic source device 50 and is transmitted via the ground. Here, in a case where hydraulic fracturing is performed in the vicinity of the vibration receiving device 60 and in a case where a natural earthquake occurs, the vibration receiving device 60 receives the vibration signals due to a microseism caused by the hydraulic fracturing and the vibration signals due to the natural earthquake in addition to the vibration signals due to the vibration wave generated by the seismic source device 50. Hereinafter, the vibration signals received by the vibration receiving device 60 are referred to as measured vibration signals. The measured vibration signals include the vibration signals due to the microseism and the natural earthquake in addition to the vibration signal due to the vibration wave generated from the seismic source device 50, and the vibration signals due to the microseism and the natural earthquake are referred to as differential signals.

The signal processing apparatus 1 is connected to each of the plurality of vibration receiving devices 60 so as to communicate with them, and acquires and analyzes the measured vibration signals received by the vibration receiving devices 60. Specifically, the signal processing apparatus 1 removes the influence due to the vibration wave of the seismic source device 50 from the measured vibration signals and extracts the differential signals. It should be noted that the signal processing apparatus 1 may be also connected to the seismic source device 50 so as to communicate with it, and may obtain various pieces of information from the seismic source device 50 as needed. A specific configuration of the signal processing apparatus 1 for extracting the differential signals is explained below.

[Configuration of the Signal Processing Apparatus 1]

Figure 3:
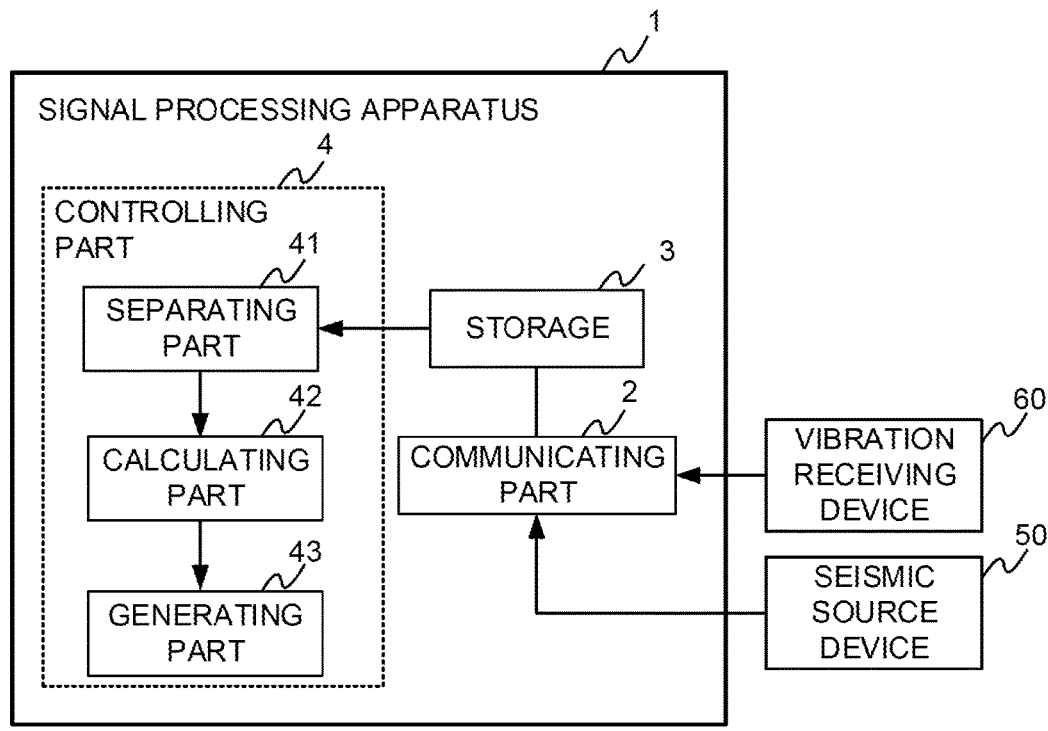
FIG. 3 shows a block diagram of a function configuration of a signal processing apparatus.

FIG. 3 shows a block diagram of a function configuration of the signal processing apparatus 1. As shown in FIG. 3, the signal processing apparatus 1 includes a communicating part 2, a storage 3, and a controlling part 4.

The communicating part 2 sends and receives various pieces of information with each of the seismic source device 50 and the vibration receiving devices 60 through a prescribed wired or wireless communication line. For example, the communicating part 2 receives the measured vibration signals measured by each of the vibration receiving devices 60 from each of the vibration receiving devices 60. The measured vibration signals received from the vibration receiving device 60 are supplied to the controlling part 4, the influence due to the vibration wave of the seismic source device 50 is removed, and the differential signals are extracted therefrom in the controlling part 4. Further, the communicating part 2 receives log information about operation of the seismic source device 50 from the seismic source device 50. The signal processing apparatus 1 can calculate the vibration wave generated from the seismic source device 50 by analyzing this log information. As shown in FIG. 2, because the seismic source device 50 is precisely controlled during the steady operation, the vibration wave to be generated is controlled. On the other hand, because the control of seismic source device 50 is not stable during the below-mentioned reversal period, the vibration wave to be generated is also not stable. The signal processing apparatus 1 can calculate the vibration wave by using the log information even during such a period when the control is not stable.

Returning to FIG. 3, the storage 3 includes, for example, a read only memory (ROM) and a random access memory (RAM). The storage 3 stores various programs and various pieces of data for making the signal processing apparatus 1 operate. Further, the storage 3 stores various pieces of information received from the seismic source device 50 and vibration receiving devices 60 through the communicating part 2. Specifically, the storage 3 stores the measured vibration signals received by the vibration receiving device 60, the log information received by the seismic source device 50, and the like.

It should be noted that a transfer function of the ground may vary according to the environmental condition such as weather and temperature, and the vibration wave generated from the seismic source device 50 may be received as different vibration signals by the vibration receiving device 60 when the environmental condition is different. In an extreme example, in a cold district where the ground freezes in winter and the frozen ground thaws out in summer, the transfer function of the frozen ground in winter differs from the transfer function of the mud in summer and the vibration signals received by the vibration receiving device 60 also differ from each other. It should be noted that, as shown in the below-mentioned FIG. 14, the influence due to rainfall was actually confirmed. Accordingly, the storage 3 may store the measured vibration signals (specifically, the below-mentioned standard periodic signals) received by the vibration receiving device 60 in association with the environmental condition.

The controlling part 4 includes, for example, a central processing unit (CPU). The controlling part 4 controls the functions related to the signal processing unit 1 by executing the various programs stored in the storage 3. Specifically, the controlling part 4 extracts, from the measured vibration signals received by the vibration receiving device 60, the differential signals by removing the influence due to the vibration waves of the seismic source device 50 from the measured vibration signals.

Figure 4:
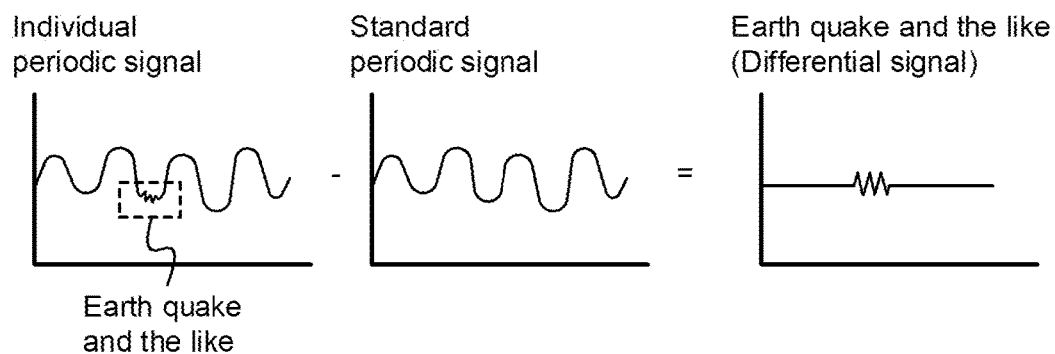
FIG. 4 shows an outline of control by a controlling part of the signal processing unit.

Here, an outline of the control by the controlling part 4 is shown in FIG. 4. In the steady operation state, the vibration wave generated from the seismic source device 50 is precisely controlled and has periodic sweep waveforms. Accordingly, the vibration receiving device 60 periodically receives substantially constant measured vibration signals in a state where no other vibrations such as a natural earthquake are generated. In the present exemplary embodiment, such substantially constant measured vibration signals are calculated as standard periodic signals.

On the other hand, when the natural earthquake occurs, the vibration receiving device 60 receives the measured vibration signals due to the vibration waves generated from the seismic source device 50 and the vibration wave caused by the natural earthquake and the like. Accordingly, the controlling part 4 removes the influence of the vibration receiving device 60 by subtracting the standard periodic signals from the measured vibration signals received by the vibration receiving device 60 and extracts only the differential signals due to the vibration waves caused by the natural earthquake and the like. More specifically, individual periodic signals having the same length as the length of the standard periodic signals are separated from the measured vibration signals, and the differential signals are extracted by subtracting the standard periodic signals from these individual periodic signals. Hereinafter, a specific configuration of the controlling part 4 is explained.

[Control During the Steady Operation]

First, the control performed by the controlling part 4 during the steady operation of the seismic source device 50 is explained. Here, a seismic source device for generating only either one of vertical or horizontal vibration waves and a seismic source device for generating both vertical and horizontal vibration waves are known as a seismic source device for generating artificial vibration wave. For example, a seismic source device for generating the vibration wave by applying a vertical vibration to the ground surface is a seismic source device that generates only the vertical vibration wave, and a seismic source device for generating the vibration wave by rotating an eccentric weight like the above-mentioned ACROSS is a seismic source device that generates both vertical and horizontal vibration waves. The control during the steady operation explained below can be preferably applied to both of these seismic source devices.

Returning to FIG. 3, the controlling part 4 includes a separating part 41, a calculating part 42, and a generating part 43.

The separating part 41 separates the individual periodic signals having a period according to a periodicity of the vibration wave generated by the seismic source device 50 from the measured vibration signals received by the vibration receiving device 60. Here, the period according to the periodicity of the vibration wave generated by the seismic source device 50 is "a period of the vibration wave generated by the seismic source device 50×N (N=an integer of 2 or more)." In the present exemplary embodiment, since the period of the vibration wave generated by the seismic source device 50 is 200 seconds, the separating part 41 separates the individual periodic signals at, for example, every 400 seconds (N=2) from the measured vibration signals.

The calculating part 42 calculates the standard periodic signals from the separated individual periodic signals. More specifically, a discrete Fourier transform of the individual periodic signal is performed to calculate the standard periodic signal in which the influence of variation of the individual periodic signals is suppressed. Although an arbitrary calculation method of the standard periodic signal can be used by the calculating part 42, an example of the calculation method is explained with reference to FIG. 5.

Figure 5A:
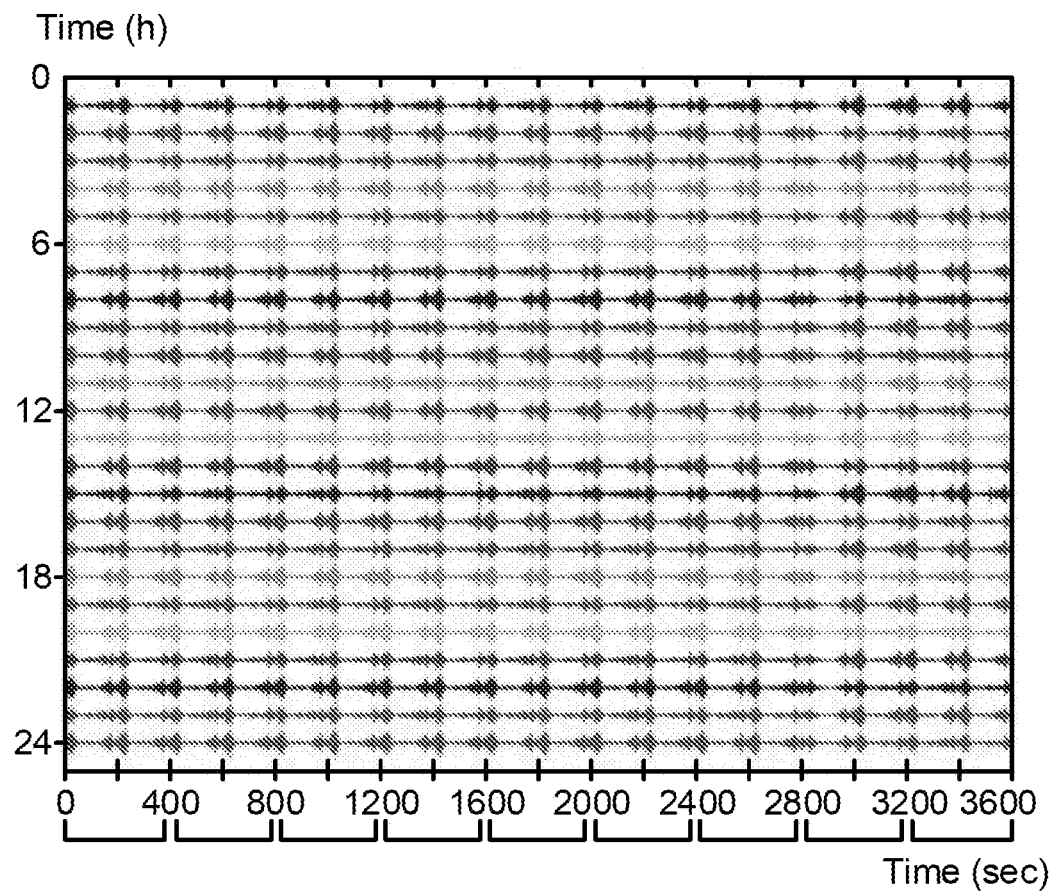
FIG. 5A shows an example of measured vibration signals received by a vibration receiving device.

FIG. 5A shows an example of the measured vibration signals received by one vibration receiving device 60. The horizontal axis indicates seconds and the vertical axis indicates hours. Since the horizontal axis indicates "0 seconds to 3600 seconds," a column in FIG. 5A shows results of receiving the measured vibration signals in a one-hour unit, and because the vertical axis indicates "1-hour to 24-hours," FIG. 5A as a whole shows the results of receiving the measured vibration signals in a one-day unit.

Figure 5B:
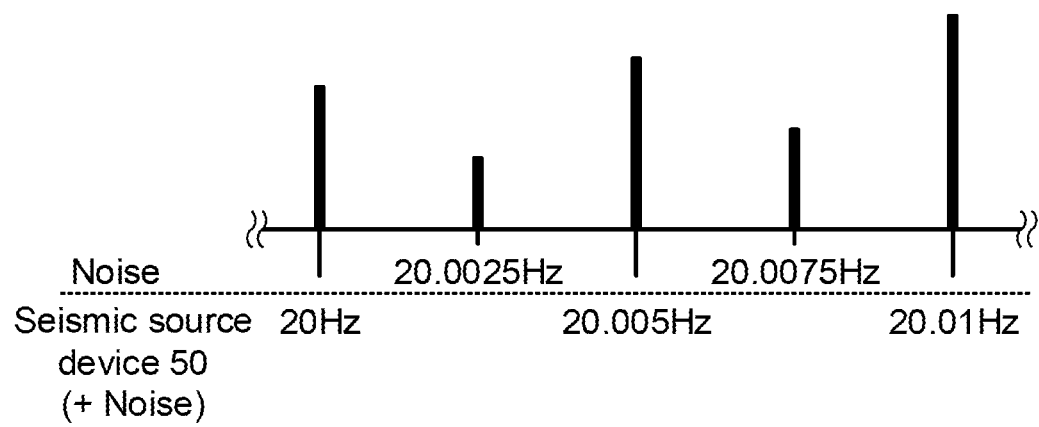
FIG. 5B schematically shows a result of a discrete Fourier transform of the measured vibration signals.

As mentioned above, the vibration signals at every 400 seconds among the measured vibration signals received by the vibration receiving devices 60 are the individual periodic signals. The calculating part 42 performs the discrete Fourier transform on the individual periodic signals that are each 400 seconds. FIG. 5B schematically shows a result of the discrete Fourier transform. The seismic source device 50 in the steady operation is precisely controlled such that the vibration wave has sweep waveforms at every 200 seconds. Accordingly, when the discrete Fourier transform is performed at every 400 seconds, a spectrum of the vibration wave generated from the seismic source device 50 appears in every 0.005 Hz (1/200), for example, a frequency F=5.000, 5.005, 5.010, . . . 49.995, 50.000 Hz. On the other hand, at the frequency F+0.0025 Hz (1/400), the spectrum of the vibration signals due to the vibration wave of the seismic source device 50 does not appear, but noise such as a ground motion noise appears.

[The First Calculation Method of the Standard Periodic Signal During the Steady Operation]

The calculating part 42 calculates the standard periodic signal by averaging a plurality of individual periodic signals by using inverses of the variances of noise included in each of the individual periodic signals as weights. Specifically, the calculating part 42 multiplies the inverse of the variance of a noise component appearing at the frequency F+0.0025 Hz by the frequency F in which the vibration wave generated from the seismic source device 50 appears, and obtains the average value of the plurality of individual periodic signals. Then, the standard periodic signal is calculated by performing the inverse Fourier transform on the calculated weighted average value. By using such an inverse of the noise variance as a weight, the influence of noise can be an inverse of a square root of M (i.e. $1/\sqrt{M}$) where M is the number of the individual periodic signals used for calculating the average value. That is, the influence of noise can be decreased by increasing the number of stored individual periodic signals.

[The Second Calculation Method of the Standard Periodic Signal During the Steady Operation]

Further, the calculating part 42 may calculate a median of the plurality of individual periodic signals as the standard periodic signal. Specifically, the calculating part 42 calculates the standard periodic signal by obtaining the median of the plurality of individual periodic signals of the frequency F at which the vibration wave generated from the seismic source device 50 appears and by performing the inverse Fourier transform.

In this manner, the standard periodic signal due to the controlled vibration wave during the steady operation can be estimated by calculating the standard periodic signal from a weighted average due to the noise variance or the median of frequency components $N_2$. It should be noted that a result of measurement of the vibration wave generated from the seismic source device 50 varies according to the position where the vibration receiving device 60 is installed. Therefore, the calculating part 42 calculates the standard periodic signal for each of the plurality of vibration receiving devices 60. Further, as mentioned above, the result of measurement of the vibration wave generated from the seismic source device 50 varies according to the environmental condition such as weather, temperature, and the like. Therefore, the calculating part 42 preferably calculates the standard periodic signal according to the environmental condition.

Returning to FIG. 3, the generating part 43 subtracts the standard periodic signal from the measured vibration signals received by the vibration receiving device 60 and generates the differential signals indicating the difference between the measured vibration signals and the standard periodic signal. At this time, the generating part 43 may generate the differential signals on the basis of the standard periodic signal corresponding to the environmental condition at the time when the vibration receiving device 60 receives the measured vibration signals.

Here, when the measured vibration signals do not include vibration signals due to other vibrations such as a microseism and a natural earthquake, the measured vibration signals and the standard periodic signal substantially coincide during the same period (400 seconds). On the other hand, when the measured vibration signals include vibration signals due to other vibrations such as a microseism and a natural earthquake, the measured vibration signals differ from the standard periodic signal by these vibration signals even in the same period. Therefore, the vibration receiving device 60 can detect the microseism, the natural earthquake, and the like by observing the differential signals generated by the generating part 43 even in a state where the seismic source device 50 is operating.

[Processing Flow During the Steady Operation]

Figure 6:
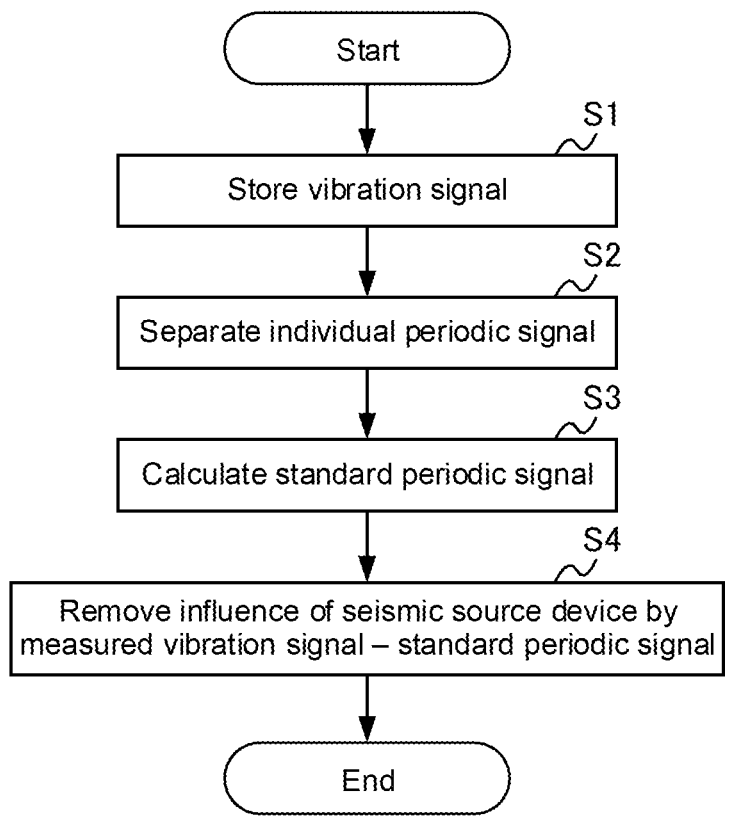
FIG. 6 shows a flow chart showing a flow of a process of the controlling part.

FIG. 6 shows a flow chart showing a flow of process of the controlling part 4 during the steady operation of the seismic source device 50.

In step S1, the transmitting part 2 receives the measured vibration signals from the vibration receiving device 60, and the storage 3 stores the received measured vibration signals. Subsequently, in step S2, the separating part 41 separates the individual periodic signals having a period according to a periodicity of the vibration wave generated from the seismic source device 50 from the measured vibration signals.

Next, in step S3, the calculating part 42 calculates the standard periodic signal from the individual periodic signals. Specifically, the calculating part 42 calculates the standard periodic signal on the basis of the weighted average that uses the inverse of the variance of the frequency component $N_2$+0.0025 Hz corresponding to the noise as a weight or the median of the frequency components $N_2$ in which the vibration wave generated from the seismic source device 50 appears. Subsequently, in step S4, the generating part 43 subtracts the standard periodic signal from the measured vibration signals and removes the influence of the seismic source device 50.

The details of the control during a steady operation of the seismic source device 50 were explained above. The control in a case where the seismic source device 50 is capable of performing a reversal operation is explained hereafter.

[Outline of an Active Seismic Exploration]

Roughly speaking, an active seismic exploration using the seismic source device 50 is an exploration method that obtains a transfer function of the ground from the vibration signals of the vibration wave generated from the seismic source device 50 and the measured vibration signals received by the vibration receiving device 60, and that performs an amplitude analysis, a travel-time analysis, and the like by using this transfer function.

Figure 7:
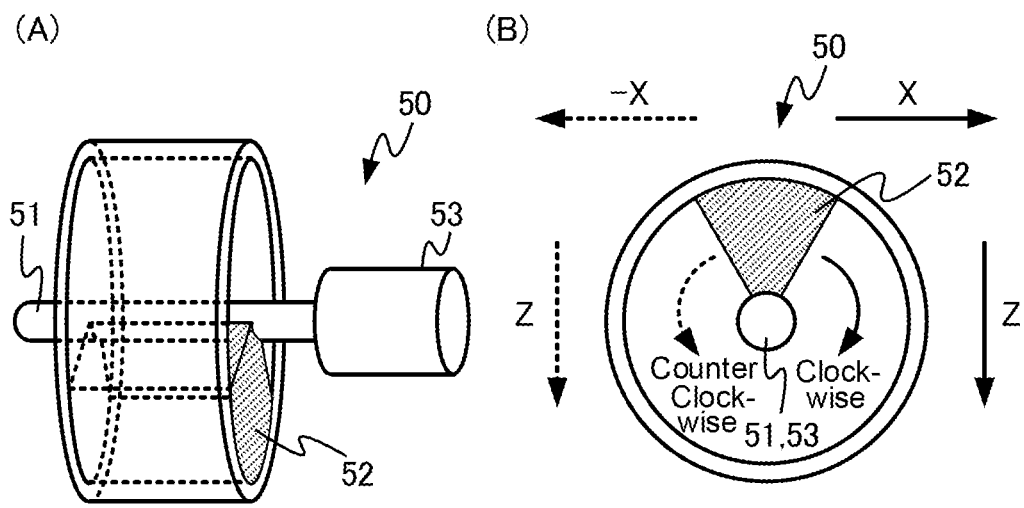
FIG. 7 shows a configuration of a seismic source device.

Here, the above-mentioned seismic source device that generates the vibration wave by rotating an eccentric weight such as the ACROSS generates the vibration wave in a vertical and a horizontal directions. FIG. 7 schematically shows a configuration of such a seismic source device 50, FIG. 7A shows a perspective view of the seismic source device 50, and FIG. 7B shows a front view of the seismic source device 50. As shown in FIG. 7A, the seismic source device 50 generates the vibration wave by precisely controlling and rotating a weight 52 that is eccentric from a rotational axis 51 by a servomotor 53.

As shown in FIG. 7B, assuming that the seismic source device 50 generates the vibration wave in the horizontal direction "X" and the vertical direction "Z" when the weight 52 is rotated in the normal direction, the seismic source device 50 generates the vibration wave in the horizontal direction "−X" and the vertical direction "Z" when the weight 52 is rotated in the reverse direction. Accordingly, the seismic source device 50 generates the first vibration wave having the vibration signals with the first polarity in the first period and generates the second vibration wave having the vibration signals with the second polarity that has an inverse polarity of the first polarity in the horizontal direction or the vertical direction in the second period whose length is the same as the length of the first period. Specifically, the seismic source device 50 generates the vibration wave in the horizontal direction "X" and the vertical direction "Z" by rotating the weight 52 in the normal direction in the first period, and generates the vibration wave in the horizontal direction "−X" and the vertical direction "Z" by rotating the weight 52 in the reverse direction in the second period.

Figure 8A:
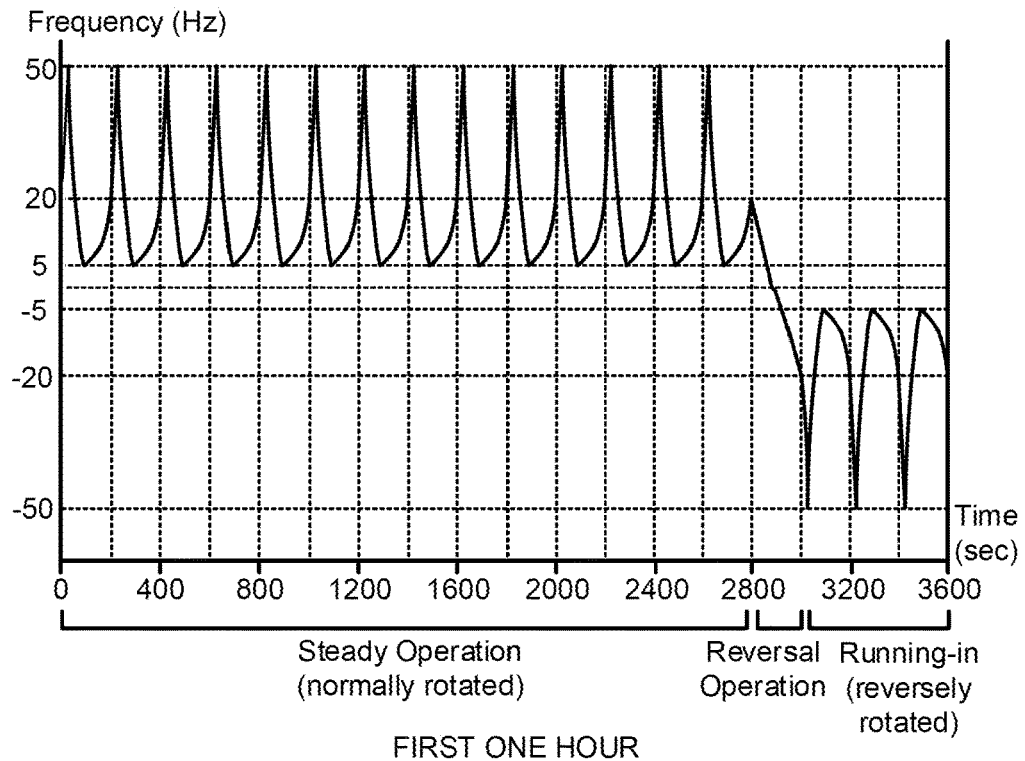
FIG. 8A shows the vibration wave generated by the seismic source device.
Figure 8B:
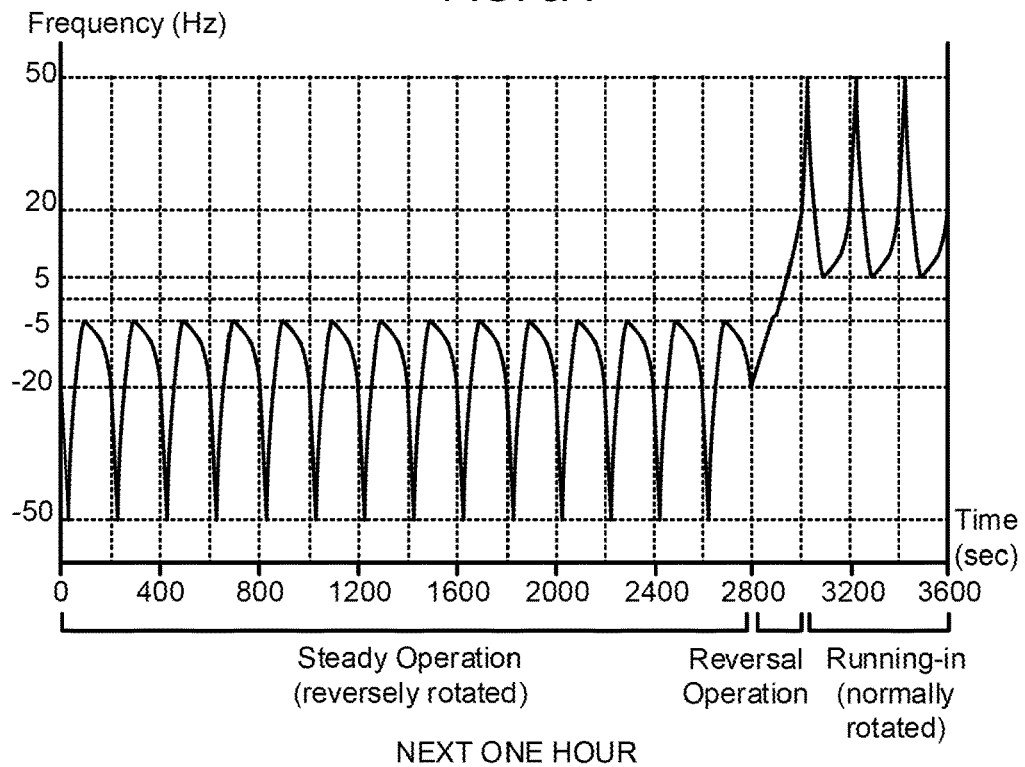
FIG. 8B shows the vibration wave generated by the seismic source device.

Here, an example of the vibration wave generated by the seismic source device 50 is shown in FIG. 8. In FIG. 8, the horizontal axis indicates time (seconds) and the vertical axis indicates the frequency with a sign of the vibration wave. FIG. 8A shows the frequency of the vibration wave of one hour when the weight 52 is rotated clockwise, and FIG. 8B shows the frequency of the vibration wave of the next one hour of FIG. 8A when the weight 52 is rotated counterclockwise. It should be noted that, in FIG. 8, the seismic source device 50 is steadily operated (rotated clockwise or counterclockwise) during "0 seconds to 2800 seconds," and the seismic source device 50 is controlled for reversal during "2800 seconds to 3000 seconds." Further, during "3000 seconds to 3600 seconds," a running-in operation (with counterclockwise rotations or with clockwise rotations) for the next one hour is performed.

By adding the vibration wave generated from the seismic source device 50 during the clockwise rotation to the vibration wave generated from the seismic source device 50 during the counterclockwise rotation, the horizontal direction component of the vibration wave can be removed, and by subtracting the vibration wave generated from the seismic source device 50 during the counterclockwise rotation from the vibration wave generated from the seismic source device 50 during the clockwise rotation, the vertical direction component of the vibration wave can be removed. In the same manner, by adding the measured vibration signals received by the vibration receiving device 60 during the clockwise rotation to the measured vibration signals received by the vibration receiving device 60 during the counterclockwise rotation, the horizontal direction component of the measured vibration signals can be removed, and by subtracting the measured vibration signals received by the vibration receiving device 60 during the counter clockwise rotation from the measured vibration signals received by the vibration receiving device 60 during the clockwise rotation, the vertical direction component of the measured vibration signals can be removed.

By using the vibration signals of vibration waves from which the horizontal direction components or the vertical direction components are removed and the measured vibration signals, the transfer function focused in the vertical direction or the horizontal direction can be calculated and active seismic explorations from various viewpoints can be performed.

[A Control for a Reversal Operation]

It should be noted that the seismic source device 50 that generates the vibration wave by rotating the eccentric weight can control the vibration wave to be generated and can ensure the reproducibility of the vibration wave to be generated in a condition where the eccentric weight is capable of being rotated in a constant manner. The condition where the eccentric weight is capable of being rotated in a constant manner corresponds to, for example, the steady operation (0 second to 2800 seconds) and the running-in operation (3000 seconds to 3600 seconds) in FIG. 8.

On the other hand, the eccentric weight must be accelerated in a reverse direction after being decelerated and stopped in the reversal operation (2800 seconds to 3000 seconds). During such reversal operation in which the eccentric weight is reversely rotated, the vibration wave generated from the seismic source device 50 cannot be precisely controlled and the reproducibility is lowered. A control using the above-mentioned standard periodic signal during the steady operation makes use of the periodicity of the vibration wave generated from the seismic source device 50, and is difficult to apply during the reversal operation when the reproducibility of the vibration wave cannot be definitely ensured. Accordingly, the vibration detection system S of the present disclosure enables detection of other vibrations such as a natural earthquake by the below-mentioned method even when the seismic source device 50 is in the reversal operation.

[The First Control During the Reversal Operation]

The vibration wave generated during a reversal period between the first period when the seismic source device 50 rotates clockwise the eccentric weight and the second period when the seismic source device 50 rotates counterclockwise the eccentric weight is assumed to be a transitional vibration wave. In the first control mentioned below, the calculating part 42 calculates the median of the measured vibration signals due to the transitional vibration waves received by the vibration receiving device 60 in the plurality of reversal periods as the standard periodic signal in the reversal period.

Figure 9:
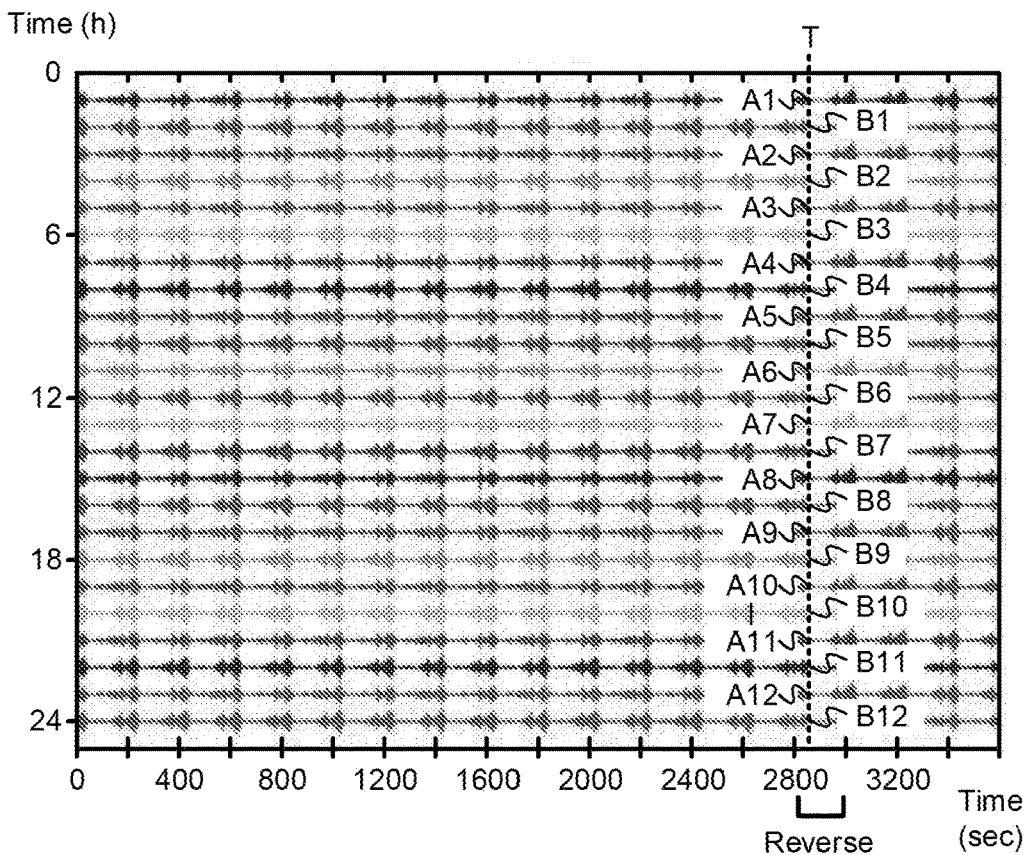
FIG. 9 shows an example of the measured vibration signals received by the vibration receiving device.

FIG. 9 shows an example of the measured vibration signals received by one vibration receiving device 60. In a case where the rotation direction of the eccentric weight is reversed every hour, 12 pieces of data of each of i) the measured vibration signals during the time when the eccentric weight is driven from the clockwise rotation to the counterclockwise rotation and ii) the measured vibration signals during the time when the eccentric weight is driven from the counterclockwise rotation to the clockwise rotation can be obtained per day. The calculating part 42 obtains the median of the plurality of measured vibration signals (12 pieces of data) and calculates the standard periodic signal during the reversal period. Specifically, the calculating part 42 calculates the median of the measured vibration signals A1 to A12 within an arbitrary time T during the reversal period as the standard periodic signal of the time when the eccentric weight is driven from the clockwise rotation to the counterclockwise rotation. Further, the calculating part 42 calculates the median of the measured vibration signals B1 to B12 within the arbitrary time T during the reversal period as the standard periodic signal of the time when the eccentric weight is driven from the counterclockwise rotation to the clockwise rotation.

The calculating part 42 can remove the influence of the seismic source device 50 even during the reversal operation by subtracting the calculated standard periodic signal from the measured vibration signals received by the vibration receiving device 60 during the reversal operation. The inventors of the present disclosure performed the detection of vibration during the reversal operation by using the first control and succeeded in detecting the around motion of 50 μkines (=5×10−7 m/s) with the vibration receiving devices 60 except for the vibration receiving devices 60 in the vicinity (10 m) of the seismic source device 50. Further, all of the vibration detecting devices 60 succeeded in detecting the vibration having a predetermined magnitude or more such as a natural earthquake.

[The Second Control During the Reversal Operation]

Furthermore, in the second control, the calculating part 42 calculates the transfer function of the around from the seismic source device 50 to the vibration receiving device 60 during the steady operation (during the first period or the second period) of the seismic source device 50, and calculates the standard periodic signal in the reversal period on the basis of the transitional vibration wave during the reversal operation and the calculated transfer function.

Figure 10A:
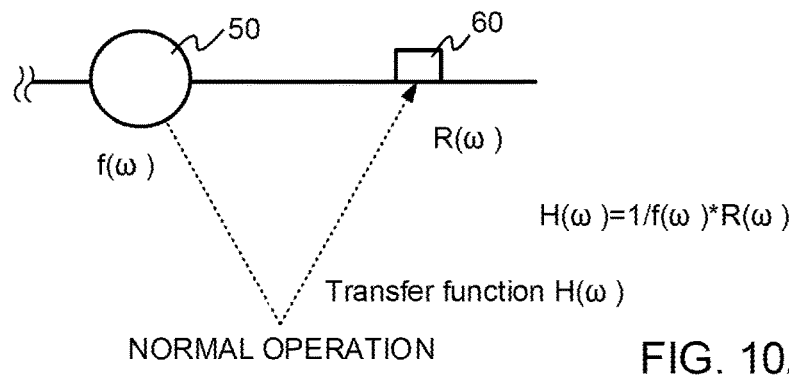
FIG. 10A shows an example of a calculation method of a standard periodic signal during a reversal period.
Figure 10B:
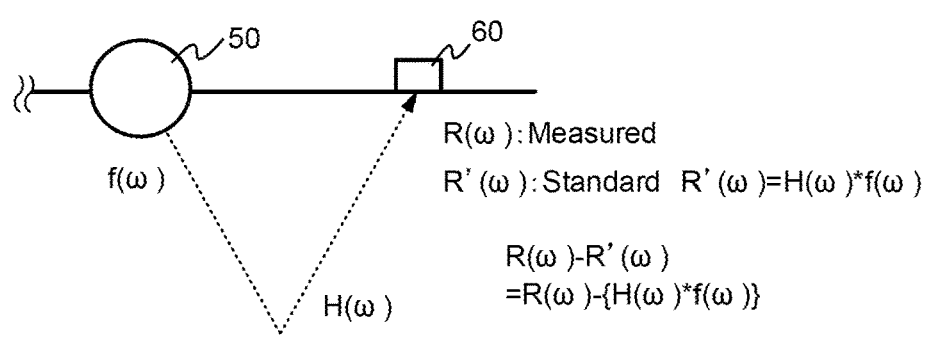
FIG. 10B shows an example of a calculation method of a standard periodic signal during a reversal period.

As shown in FIG. 10A, when a vibration signal of the vibration wave generated from the seismic source device 50 is assumed to be "$f(\omega)$" and a measured vibration signal received by the vibration receiving device 60 is assumed to be "R(ω)," the transfer function H(ω) of the ground from the seismic source device 50 to the vibration receiving device 60 can be calculated by the following equation.

$$H(\omega)=1/f(\omega) \times R(\omega)$$

In the reversal operation, although the vibration wave generated from the seismic source device 50 is not controlled and cannot be known in advance, the signal processing apparatus 1 can calculate the vibration wave actually generated from the seismic source device 50 from the log information of the action of the seismic source device 50 (for example, a position and a speed of the eccentric weight). Accordingly, the calculating device 42 can obtain the vibration signal f(ω) of the vibration wave generated from the seismic source device 50 even during the reversal operation. Further, because the transfer function H(ω) of the ground from the seismic source device 50 to the vibration receiving device 60 has already been calculated during the steady operation, the standard periodic signal R'(ω) can be calculated by the following equation:

$$R'(\omega)=H(\omega) \times f(\omega).$$

By the calculating part 42 subtracting the standard periodic signal R'(ω) calculated in this manner from the measured vibration signal R(ω) that is actually received by the vibration receiving device 60 during the reversal operation, the influence of the seismic source device 50 can be removed and other vibrations such as a natural earthquake can be detected even during the reversal operation when precise control is difficult to perform.

It should be noted that, by taking a closer look, the transfer function H(ω) varies in a case where hydraulic fracturing is performed and a fracture is generated in the ground during the steady operation. Although such variations are not negligible in terms of a half a year's time or one year's time due to the accumulation of the variations, a single instance or only a few instances of fracture generation is sufficiently negligible in terms of the level of the vibration wave of the seismic source device 50. Accordingly, the calculating part 42 can remove the influence of the seismic source device 50 and detect other vibrations such as a natural earthquake even when using the transfer function H(ω) calculated during the steady operation in the vicinity of (for example, 24 hours immediately before) the reversal operation.

It should be noted that, in the present exemplary embodiment, the seismic source device 50 generates the vibration wave that varies "from 5 Hz to 50 Hz" during the steady operation of the clockwise rotation and generates the vibration wave that varies "from −5 Hz to −50 Hz" during the steady operation of the counterclockwise rotation. Accordingly, during the steady operation, the seismic source device 50 generates the vibration wave within the range of "±5 Hz to ±50 Hz" and the calculating part 42 calculates the transfer function H(ω) within the range of "±5 Hz to ±50 Hz."

Here, because the polarity of the vibration signal of the vibration wave inverts during the reversal operation, the seismic source device 50 generates the vibration wave within the range of "5 Hz to −5 Hz." In this respect, because the vibration wave within the range of "5 Hz to −5 Hz" does not occur during the steady operation, the transfer function H(ω) within the range of "5 Hz to −5 Hz" cannot be calculated. Accordingly, with the second control method, the calculating part 42 cannot calculate the standard periodic signal R'(ω) within the range of "5 Hz to −5 Hz" during the reversal operation.

However, because the vibration wave within "5 Hz to −5 Hz" is sufficiently small, it can generally be ignored, except by the vibration receiving devices 60 in the vicinity of the seismic source device 50. The inventors of the present disclosure actually performed the detection of vibration during the reversal operation by using the second control and succeeded in detecting the ground motion of 50 μkines (=5×10−7 m/s) with a vibration receiving devices 60 that is 70 m away from the seismic source device 50.

Further, because the vibration wave generated from the seismic source device 50 can be controlled, the influence of the seismic source device 50 can be reduced even when there exists a range in which the calculating part 42 cannot calculate the transfer function H(ω). For example, by assuming the range of the vibration wave generated from the seismic source device 50 to be not "±5 Hz to ±50 Hz" but "±1 Hz to ±50 Hz," the range in which the transfer function H(ω) cannot be calculated can be reduced to "1 Hz to −1 Hz" and the influence of the seismic source device 50 can be sufficiently reduced. The calculating part 42 may extrapolate the transfer function within the range of "5 Hz to −5 Hz" in which the transfer function cannot be calculated from the transfer function H(ω) within the range of "±5 Hz to ±50 Hz" calculated during the steady operation and may use it.

[Control when a Plurality of the Seismic Source Devices 50 is Used]

Because the accuracy of the active seismic exploration using the seismic source device 50 can be improved by increasing the number of transmission sources and destinations, there may be a case where a plurality of the seismic source devices 50 are used. Next, control performed when the plurality of seismic source devices 50 are used is explained.

Figure 11:
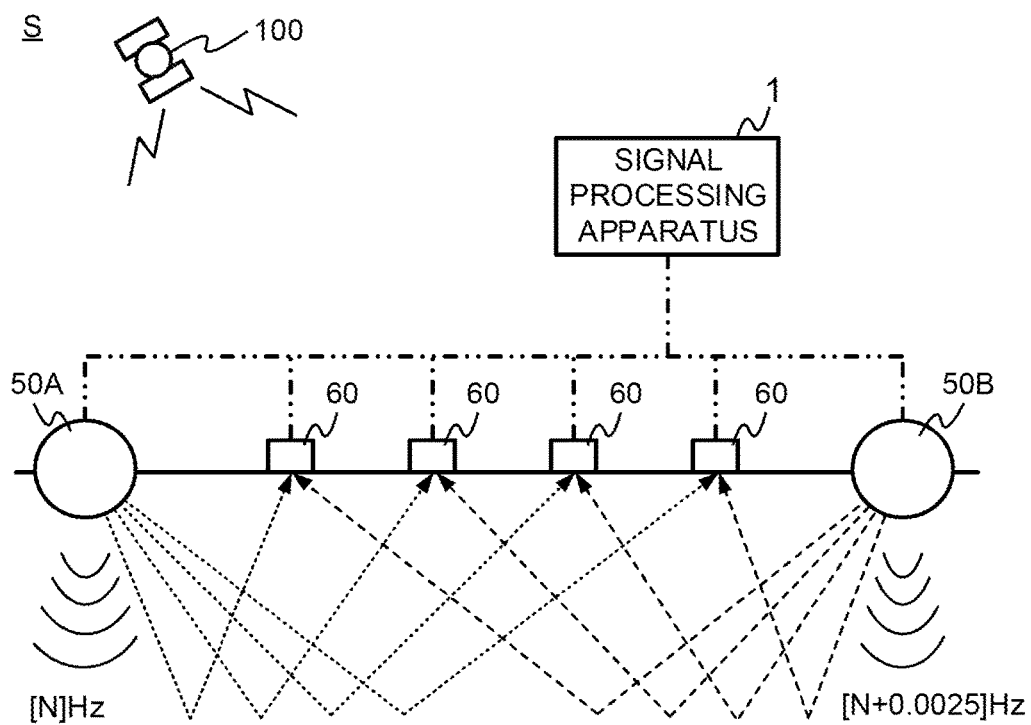
FIG. 11 shows a system configuration of the vibration detection system including two seismic source devices.

As shown in FIG. 11, when the plurality (two) of seismic source devices 50A and 50B are used, the measured vibration signals received by the vibration receiving devices 60 must be properly separated into the vibration signals due to the vibration waves generated from each of the seismic source devices 50A and 50B. Accordingly, the seismic source devices 50A and 50B each generate the vibration waves at different frequencies. In the example shown in FIG. 11 the frequency of the vibration wave generated from the seismic source device 50A is assumed to be "N (5 Hz to 50 Hz)" and the frequency of the vibration wave generated from the seismic source device 50B is assumed to be "N+0.0025 Hz (5.0025 Hz to 50.0025 Hz)." When the seismic source devices 50A and 50B are controlled in such a manner, the phases of the seismic source devices 50A and 50B are opposite at every 200 seconds and the phases of the seismic source devices 50A and 50B are the same at every 400 seconds.

Accordingly, the separating part 41 separates the individual periodic signals having a period according to a periodicity of the respective vibration waves generated from the seismic source devices 50A and 50B from the measured vibration signals received by the vibration receiving devices 60. In the example shown in FIG. 11, because the phases of the seismic source devices 50A and 50B are the same at every 400 seconds, the separating part 41 separates the individual periodic signals of, for example, every 800 seconds from the measured vibration signals.

Figure 12:
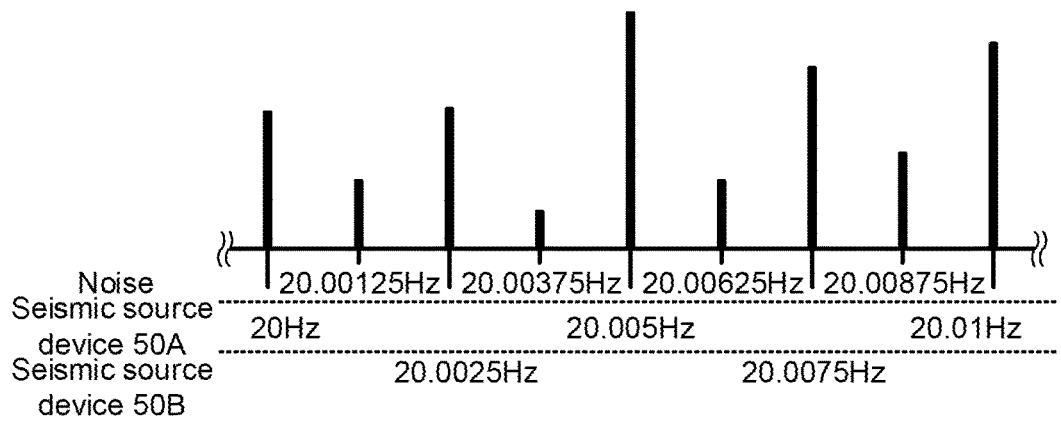
FIG. 12 schematically shows a result of a discrete Fourier transform of the measured vibration signals.

Then, when the calculating part 42 performs a discrete Fourier transform on the separated individual periodic signals (800 seconds), the spectrum of the vibration wave generated from the seismic source device 50A appears at the frequency N=5.000, 5.005, 5.010, . . . 49.995, 50.000 Hz, and the vibration wave generated from the seismic source device 50B appears at the frequency N+0.0025=5.0025, 5.0075, 5.0125, . . . 49.9975, 50.0025 Hz as shown in FIG. 12. Hence, the vibration signals due to the vibration waves generated from the seismic source devices 50A and 50B can be properly separated.

It should be noted that an explanation of the details about the control thereafter is omitted because the control is similar to the controls already explained above, but one example is explained. Because the spectrums of the vibration waves of the seismic source devices 50A and 50B do not appear and noise such as ground motion noise appears in the frequency N+0.00125, the calculating part 42 can calculate the standard periodic signal by the weighted average using an inverse of the noise variance and the like in the same manner as explained in "The first calculation method of the standard periodic signal during the steady operation."

[Experimental Data]

Figure 13:
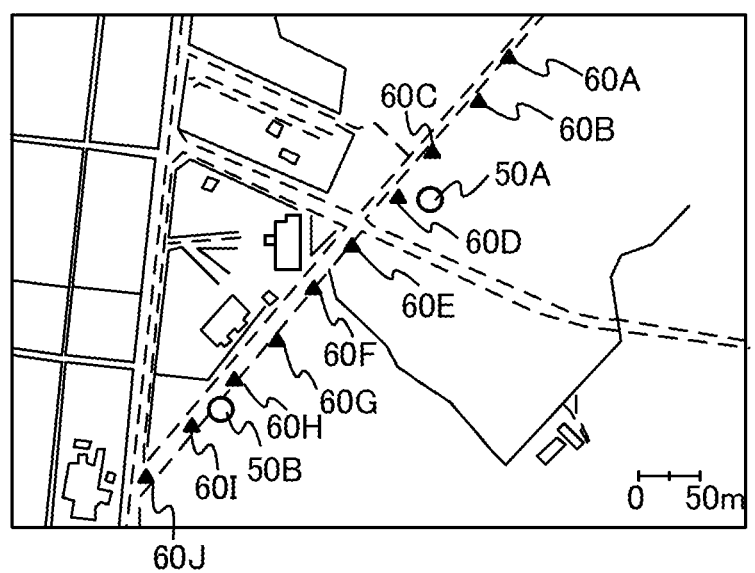
FIG. 13 shows an installation example of the seismic source devices and the vibration receiving devices during the experiment.

The exemplary embodiment of the vibration detection system S of the present disclosure was explained above. Next, a portion of the data from the experiment performed by the inventors of the present disclosure at the Kashiwazaki test field is shown in FIGS. 13 and 14. As shown in FIG. 13, the inventors installed two seismic source devices 50A and 50B and 10 vibration receiving devices 60A to 60J in the test field, and performed the experiment to remove the influence due to the vibration waves generated from the seismic source devices 50A and 50B from the measured vibration signals received from the vibration receiving devices 60A to 60J. FIG. 14 shows original waveforms of the measured vibration signals in the vibration receiving device 60G (FIG. 14A) and signal waveforms of the differential signals after the influence is removed (FIG. 14B).

In the present experiment, the inventors calculated the standard periodic signal by using the weighted average using an inverse of the noise variance during the steady operation "0 seconds to 2800 seconds" and during the running-in "3000 seconds to 3600 seconds" and removed the influence of the vibration waves of the seismic source devices 50A and 50B. Further, the inventors calculated the standard periodic signal from the median of the plurality (12) of measured vibration signals during the reversal operation of "2800 seconds to 3000 seconds," and removed the influence of the vibration waves of the seismic source devices 50A and 50B. Furthermore, for comparison, a process for removing the influence was not performed with respect to "3000 seconds to 3600 seconds" in the 24th hour.

With reference to FIG. 14, it can be confirmed that the influence of the vibration waves of the seismic source devices 50A and 50B was properly removed. As a result, for example, the natural earthquake that occurred at the time indicated by a reference numeral 111 could be properly detected. It should be noted that the signal waveforms after being processed at the time indicated by a reference numeral 112 are slightly disordered. The inventors checked the weather data and confirmed that it was raining at the time indicated by the reference numeral 112. Hence, it was found that the environmental condition such as weather and temperature and the measured vibration signals received by the vibration receiving device 60 are significantly correlated.

[Effect of the Vibration Detection System S]

According to the vibration detection system S of the present disclosure explained above, the following effects are expected.

The vibration detection system S separates the individual periodic signals from the measured vibration signals received by the vibration receiving device 60. Because the individual periodic signals are to be separated every period according to the periodicity of the vibration waves generated from the seismic source device 50, a normal periodic signal (the standard periodic signal) including no other vibration signal can be calculated by comparing the plurality of individual periodic signals even when the measured vibration signals include other vibration signals caused by a natural earthquake or the like. The standard periodic signal calculated in such a manner can remove the influence of the vibration wave of the seismic source device 50 by subtracting the standard periodic signal from the measured vibration signals received by the vibration receiving device 60 because the influence of other vibration waves such as a natural earthquake is removed and the influence by the vibration signals due to the vibration wave of the seismic source device 50 appears. In this manner, the vibration receiving device 60 can detect other vibrations such as a natural earthquake even during the operation of the seismic source device 50.

It should be noted that the seismic source device 50 is suitable for exploration of ground with various geological features by generating the vibration wave in which the frequency varies within the period.

Further, the standard periodic signal in which the influence of the other vibrations such as a natural earthquake is removed can be calculated by calculating the standard periodic signal by using the weighted average using the inverse of noise variance and the median of the frequency components in which the vibration wave of the seismic source device 50 appears.

Moreover, because the environmental condition such as weather and temperature significantly correlates with the measured vibration signals received by the vibration receiving device 60, other vibrations such as a natural earthquake can be detected even when it rains during the operation of the seismic source device 50 by storing the standard periodic signal in association with the environmental condition.

Furthermore, in the vibration detection system S, the seismic source device 50 generates the first vibration waves having the vibration signals with the first polarity and generates the second vibration waves having the vibration signals with the second polarity that is an inversion of the first polarity in the horizontal direction or the vertical direction, and the seismic source device 50 is controlled so as to alternately repeat the first period in which the first vibration wave is generated and the second period in which the second vibration wave is generated. In the vibration detection system S, the horizontal direction component and the vertical direction component generated from the seismic source device 50 can be removed by adding or subtracting the measured vibration signals that are the results of receiving these first vibration waves and the measured vibration signals that are the results of receiving the second vibration waves. As a result, the vibration detection system S can perform the active seismic exploration from various viewpoints.

It should be noted that although the vibration wave to be generated can be precisely controlled during the steady operation of the seismic source device 50, the vibration wave to be generated cannot be precisely controlled during the reversal operation that inverses the polarity. In this respect, the vibration detection system S can remove the influence of the vibration wave of the seismic source device 50 with a precision of a practical level by using the median of the measured vibration signals that are the result of receiving the transitional vibration wave during the reversal operation and the transfer function $H(\omega)$ calculated during the steady operation. Accordingly, other vibrations such as a natural earthquake can be detected even during the reversal operation of the seismic source device 50.

Further, even when the plurality of seismic source devices 50 are installed, the vibration detection system S can precisely perform the active seismic exploration since it can remove the influence of the vibration waves of each of the seismic source devices 50.

The present invention is described with the exemplary embodiments of the present disclosure but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. A vibration detection system, comprising:
 a seismic source device that generates a vibration wave repeated with a prescribed period by rotating an eccentric weight, the seismic source device varying the frequency of the vibration wave to be generated within the period by changing a rotation speed of an eccentric weight;
 a vibration receiving device that receives response waves due to the vibration wave transmitted via the ground; and
 a signal processing apparatus that processes vibration signals according to the response waves received by the vibration receiving device, wherein the signal processing apparatus including:
 a storage including a memory that stores vibration signals received by the vibration receiving device while the seismic source device is generating the vibration wave, the vibration signals containing a signal based on (i) the vibration wave and (ii) a signal based on microseism or an natural earthquake;
 a separating part that separates individual periodic signals having a period according to a periodicity of the vibration wave generated by the seismic source device from the stored vibration signals;
 a calculating part that calculates a standard periodic signal from the separated individual periodic signals; and
 a generating part that generates differential signals indicating the difference between the vibration signals received by the vibration receiving device and the standard periodic signal, the differential signal corresponding to a signal based on the microseism or the natural earthquake.

2. The vibration detection system according to claim 1, wherein
 the calculating device calculates the standard periodic signal by averaging the plurality of individual periodic signals by using inverses of the variances of noise included in each of the individual periodic signals as weights.

3. The vibration detection system according to claim 1, wherein
 the calculating part calculates a median of the plurality of individual periodic signals as the standard periodic signal.

4. A vibration detection system, comprising:
 a seismic source device that generates a vibration wave repeated with a prescribed period by rotating an eccentric weight;
 a vibration receiving device that receives response waves due to the vibration wave transmitted via the ground; and
 a signal processing apparatus that processes vibration signals according to the response waves received by the vibration receiving device, wherein the signal processing apparatus including:
 a storage including a memory that stores vibration signals received by the vibration receiving device while the seismic source device is generating the vibration wave, the vibration signals containing a signal based on (i) the vibration wave and (ii) a signal based on microseism or an natural earthquake;
 a separating part that separates individual periodic signals having a period according to a periodicity of the vibration wave generated by the seismic source device from the stored vibration signals;
 a calculating part that calculates a standard periodic signal from the separated individual periodic signals; and
 a generating part that generates differential signals indicating the difference between the vibration signals received by the vibration receiving device and the standard periodic signal, the differential signal corresponding to a signal based on the microseism or the natural earthquake,
wherein
the storage stores the standard periodic signal calculated by the calculating part in association with an environmental condition, and
the generating part generates the differential signals on the basis of the standard periodic signal that is associated with an environmental condition at the time when the vibration receiving device received the vibration signals.

5. A vibration detection system, comprising:
 a seismic source device that generates a vibration wave repeated with a prescribed period by rotating an eccentric weight;
 a vibration receiving device that receives response waves due to the vibration wave transmitted via the ground; and
 a signal processing apparatus that processes vibration signals according to the response waves received by the vibration receiving device, wherein the signal processing apparatus including:
 a storage including a memory that stores vibration signals received by the vibration receiving device while the seismic source device is generating the vibration wave, the vibration signals containing a signal based on (i) the vibration wave and (ii) a signal based on microseism or an natural earthquake;
 a separating part that separates individual periodic signals having a period according to a periodicity of the vibration wave generated by the seismic source device from the stored vibration signals;
 a calculating part that calculates a standard periodic signal from the separated individual periodic signals; and
 a generating part that generates differential signals indicating the difference between the vibration signals received by the vibration receiving device and the standard periodic signal, the differential signal corresponding to a signal based on the microseism or the natural earthquake, wherein
the seismic source device is a seismic source device that generates vibration waves including a horizontal vibration and a vertical vibration, generates the first vibration wave corresponding to the vibration signal with the first polarity in the first period, and generates the second vibration wave corresponding to the vibration signal with the second polarity that has an inverse polarity of the first polarity in the horizontal direction or the vertical direction in the second period whose length is the same as the length of the first period.

6. The vibration detection system according to claim 5, wherein
the seismic source device generates a transitional vibration wave during a reversal period between the first period and the second period, and
the calculating part calculates a median of vibration signals due to the transitional vibration waves received by the vibration receiving device during the plurality of reversal periods as the standard periodic signal during the reversal period.

7. The vibration detection system according to claim 5, wherein
the seismic source device generates a transitional vibration wave during a reversal period between the first period and the second period, and
the calculating part calculates the standard periodic signal on the basis of (i) the transfer function of the ground calculated in the first period or the second period and (ii) the transitional vibration waves.

8. The vibration detection system according to claim 1, comprising:
a plurality of seismic source devices that generate the vibration waves whose frequencies are different from each other.

* * * * *